United States Patent [19]

Agnese et al.

[11] Patent Number: 5,825,029

[45] Date of Patent: Oct. 20, 1998

[54] BOLOMETRIC DETECTION DEVICE FOR MILLIMETER AND SUB-MILLIMETER WAVES AND A METHOD FOR MANUFACTURING THIS DEVICE

[75] Inventors: Patrick Agnese, Voreppe; Jean-Michel Sajer, Audenge, both of France

[73] Assignee: Commissariat a L'Energie Atomique, Paris, France

[21] Appl. No.: 660,598

[22] Filed: Jun. 11, 1996

[30] Foreign Application Priority Data

Jun. 15, 1995 [FR] France .................................. 95 07151

[51] Int. Cl.$^6$ ...................................................... G01J 5/20
[52] U.S. Cl. .................................... 250/338.1; 250/336.1; 250/338.1; 250/338.4; 250/349; 250/394
[58] Field of Search ............................. 250/336.1, 338.1, 250/338.4, 349, 394

[56] References Cited

U.S. PATENT DOCUMENTS

| | | | |
|---|---|---|---|
| 3,660,659 | 5/1972 | Eisenman et al. ............... | 250/338.1 X |
| 3,742,235 | 6/1973 | Boatner et al. ...................... | 250/349 X |
| 5,629,521 | 5/1997 | Lee et al. .............................. | 250/338.1 |

FOREIGN PATENT DOCUMENTS

| | | |
|---|---|---|
| 0 354 369 | 2/1990 | European Pat. Off. . |
| 0 534 768 | 3/1993 | European Pat. Off. . |
| WO 90/16082 | 12/1990 | WIPO . |

OTHER PUBLICATIONS

Applied Optics, vol. 33, No. 1, pp. 11–23, Jan. 1, 1994, Lyman A. Page, et al., "Millimeter–Submillimeter Wavelength Filter System".

Infrared Phy., vol. 30, No. 6, pp. 465–478, 1990, Armand Hadni, et al., "Infrared and Millimeter Wave Absorber Structures for Thermal Detectors".

Journal of Communications Technology and Electronics, vol. 39, No. 3, pp. 113–122, 1994, A. Ya. Blank, et al., "Absorption of Electromagnetic Radiation in a Layered Metal and Insulator Structure".

Journal of Applied Physics, vol. 76, No. 1, pp. 1–24, Jul. 1994, P.L. Richards, "Bolometers for Infrared and Millimeter Waves".

Applied Optics, vol. 23, No. 6, pp. 910–914, Mar. 15, 1984, P. M. Downey, et al., "Monolithic Silicone Bolometers".

SPIE, Infrared Readout Electronics II, vol. 2226, pp. 2–13, 1994, Peter T. Timbie, et al., "Issues in the Readout of Fir and MM–Wave Bolometers for Astrophysical Applicators".

IRAM, Feb. 1995, 8 pages, R. Neri, et al., "Developpement et Exploitation de Bolometres au Sol".

SCI, vol. 93, No. 6, pp. 73 and 78, Sep. 1993, S. Beckwith, et al., "Far Infra–Red and Submillimetre Space Telescope".

Primary Examiner—Edward J. Glick
Attorney, Agent, or Firm—Oblon, Spivak, McClelland, Maier & Neustadt, P.C.

[57] ABSTRACT

A bolometric detection device for millimeter or submillimeter waves and a method for manufacturing this device. According to the invention, at least one bolometer (8) is formed on a support (6) which is transparent to the waves to be detected, each bolometer including a reflecting resonant cavity (10), a grid (12) thermally insulated from the support and positioned above the cavity, regular conductor patterns (14) which are formed on the grid and whose electrical impedance is matched to that of the void, and a thermometer (16) integral with the grid.

12 Claims, 5 Drawing Sheets

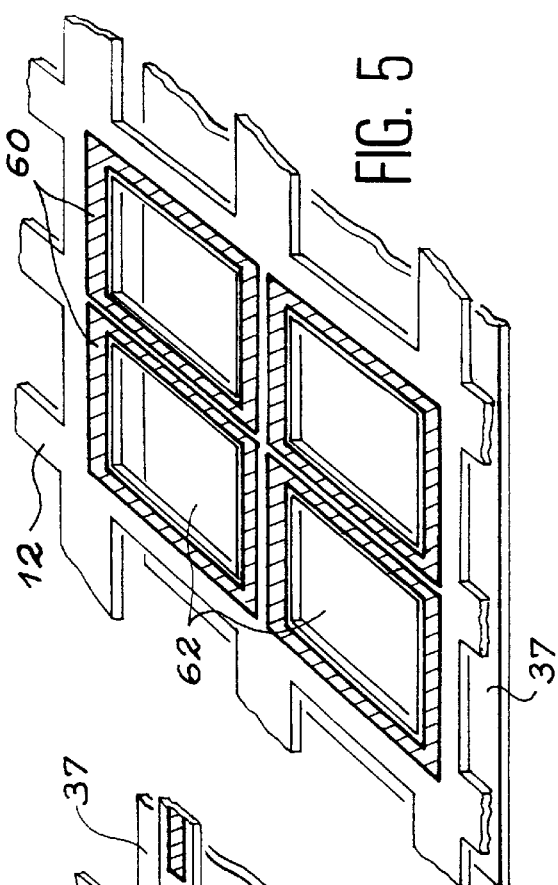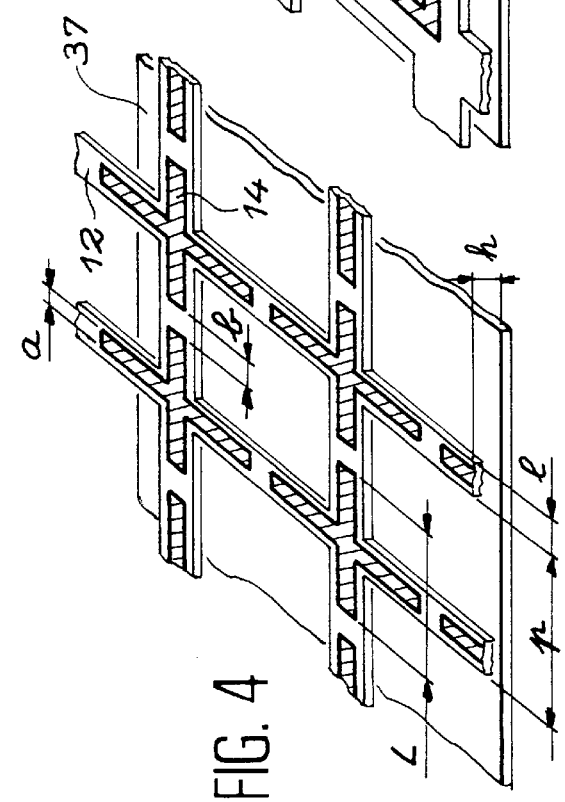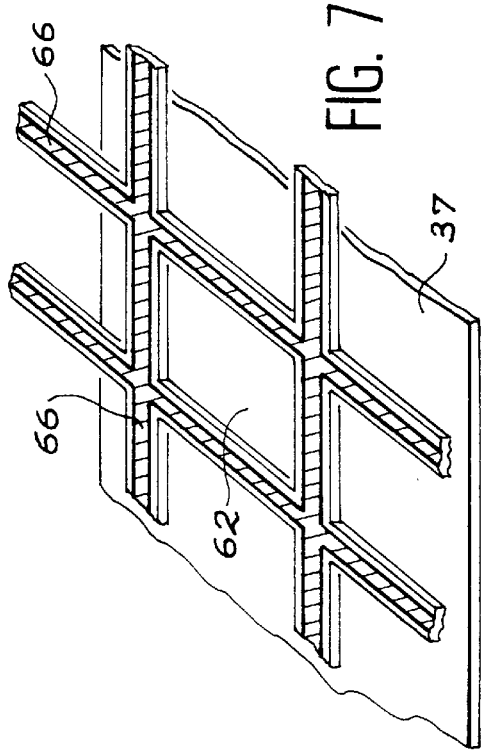

BOLOMETRIC DETECTION DEVICE FOR MILLIMETER AND SUB-MILLIMETER WAVES AND A METHOD FOR MANUFACTURING THIS DEVICE

BACKGROUND OF THE INVENTION

This invention relates to a bolometric detection device for millimeter and sub-millimeter waves as well as a method for manufacturing this device.

It is applicable notably in space astrophysics and for observation in the middle infra red and for astronomical observations from ground telescopes.

DISCUSSION OF BACKGROUND

Bolometric detection devices for millimeter and sub-millimeter waves are already known.

The known devices are made by assembling individual bolometers which are respectively extended by cones.

Documents (1) and (5) will be referred to in this context. Like other documents referred to below, they are mentioned at the end of this description.

In the known devices above-mentioned, taking account of the cones openings, the number of bolometers in these devices is limited and these devices lead to spatial under-sampling.

Furthermore, the individual production of the bolometers for these devices poses special problems of reproducibility and reliability, particularly for space applications of the devices.

DESCRIPTION OF THE INVENTION

The object of this invention is a bolometric detection device for millimeter and sub-millimeter waves which has greater reliability and which is more easily reproducible than the known devices above-mentioned.

Precisely, the object of the invention is a bolometric detection device for millimeter and sub-millimeter waves, this device including at least one bolometer formed on a support transparent to the waves to be detected, this device being characterized in that each bolometer includes:

a reflecting resonant cavity, a grid thermally insulated from the support and positioned above the cavity, an assembly of periodic patterns of electrical conductors which are formed on the grid and whose electrical impedance is matched to that of the void, and a main thermometer integral with the grid.

The conductor patterns can be electrically connected to one another or electrically insulated from one another.

Preferably, The size of the patterns is of the order of half the mean wavelength of the waves to be detected.

Also preferably, the grid spacing is of the order of half the mean wavelength of the waves to be detected.

According to one particular embodiment of the invention, each bolometer includes, in addition, an auxiliary thermometer, linked to the main thermometer for the purpose of carrying out differential temperature measurements.

The device which is the object of the invention can include, in addition, an electronic circuit for reading the signals supplied by each bolometer.

Each bolometer can be linked to a concentrator cone.

The device which is an object of the invention can include a matrix of M×N bolometers, M and N being whole numbers at least equal to 1.

This invention also relates to a method of manufacturing the detection device which is an object of this invention, characterized in that it includes the following steps:

the main thermometer and the bolometer conductor patterns are formed on a silicon/silica/silicon substrate, the grid of the bolometer is formed on this substrate, the silica is removed from the substrate under this grid, and the reflecting resonant cavity is formed under the grid.

According to a first particular way of implementing this method which is an object of the invention, in order to form the cavity, the silicon is removed from the substrate, under the grid, from the back face of the substrate, allowing a layer of silicon to remain, the thickness of which corresponds to the resonance, and a reflecting layer is formed on the silicon layer on the back face of the substrate.

According to another particular mode of implementation, in order to form the cavity, the silicon is removed from the substrate, under the grid, from the front face of the substrate, and to a depth corresponding to the resonance, and a reflecting layer is formed opposite the grid, at the bottom of the cavity, obtained by the removal of silicon.

BRIEF DESCRIPTION OF THE DRAWINGS

This invention will be better understood by reading the description of examples of embodiments given below, which are purely for information purposes and are in no way limitative, while referring to the appended drawings in which:

FIGS. 4 to 7 illustrate, schematically, different conductor patterns usable in this invention.

DETAILED DESCRIPTION OF PARTICULAR EMBODIMENTS

Figure 1:
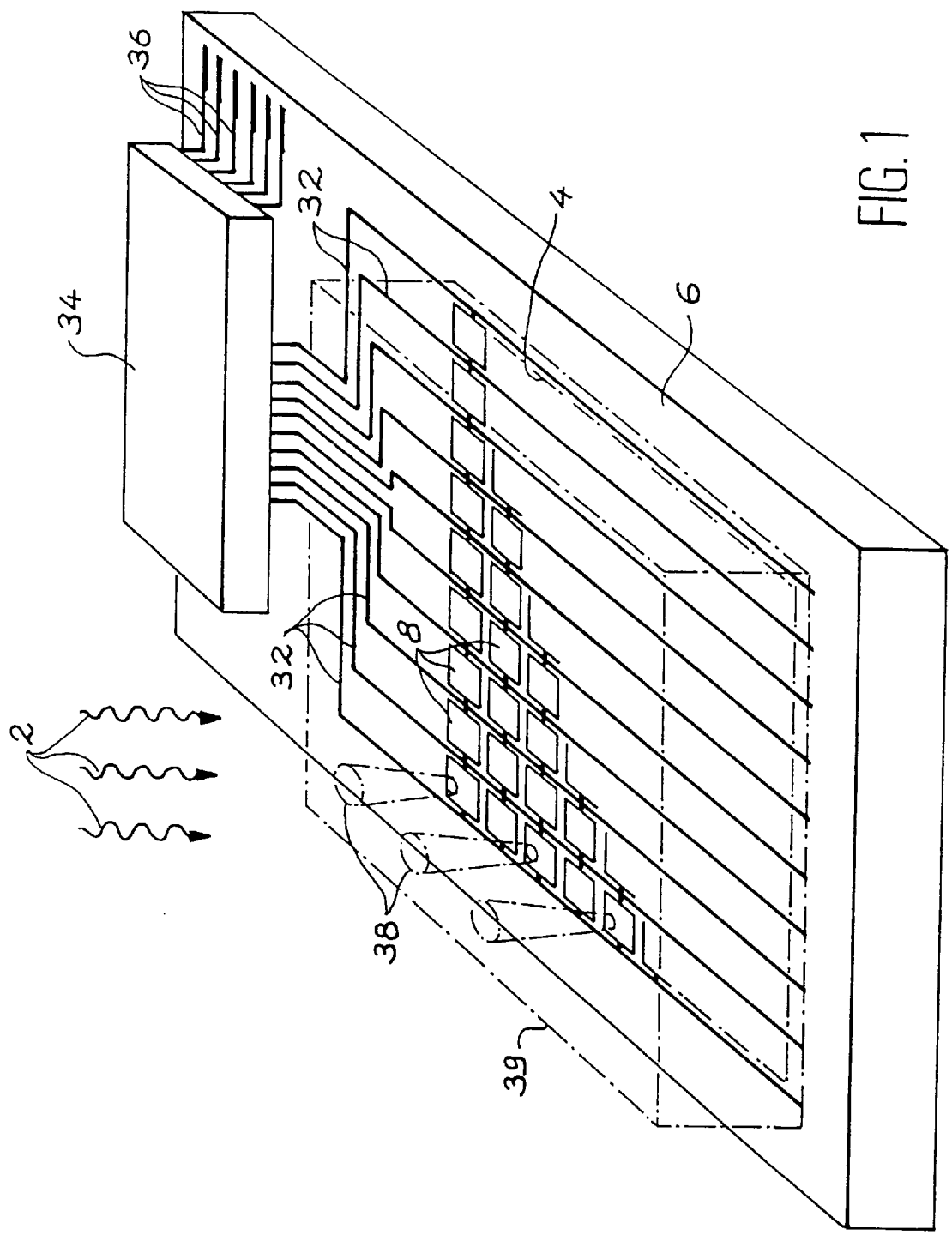
FIG. 1 is a schematic perspective view of a particular embodiment of the bolometric detection device which is an object of the invention, including a pattern of bolometers.

The device in accordance to the invention, which is schematically represented in perspective in FIG. 1, is for the bolometric detection of millimeter and sub-millimeter waves 2.

This device in FIG. 1 includes a matrix of bolometers 4 formed on a support 6 which is transparent to the waves to be detected.

Figure 2:
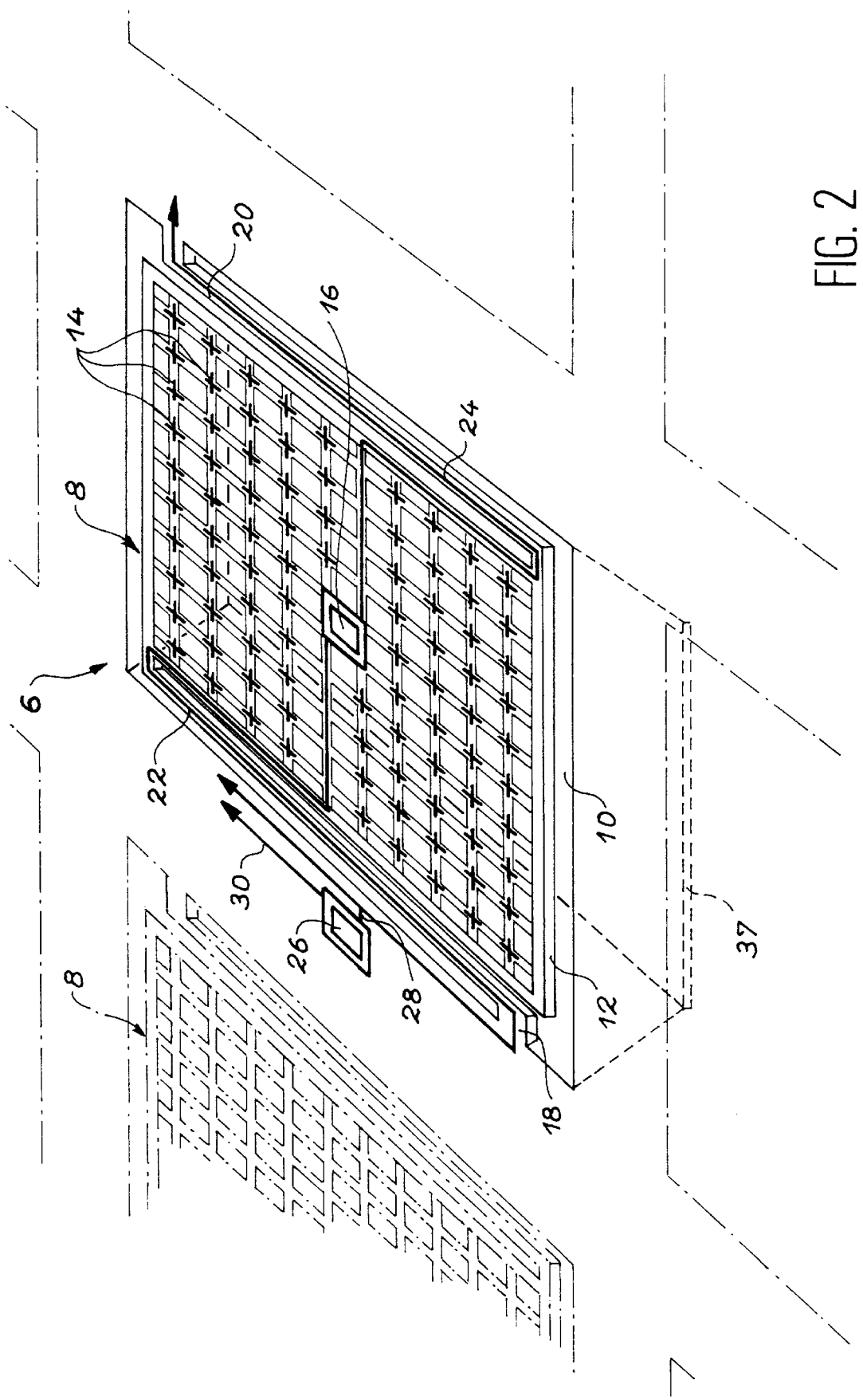
FIG. 2 is a schematic view of one of the bolometers of the device shown in FIG. 1, FIGS. 3A to 3H illustrate schematically different steps in the manufacture of a device of the type shown in FIG. 1.

FIG. 2 is a schematic perspective view of a bolometer 8 from matrix 4 of FIG. 1.

Each bolometer 8 includes:

a reflecting resonant cavity 10, a grid 12 which is thermally insulated from the support and which is positioned above the cavity 10, an assembly of periodic patterns 14 of electrical conductors which are formed on the grid 12 and whose electrical impedance is matched to that of the void, and a thermometer 16 which is integral with the grid 12.

In the example shown in FIGS. 1 and 2, the support or substrate 6 is made of a semiconductor material such as silicon.

The grid 12 of each bolometer is micro-machined from this support 6, as will be better seen below.

This grid 12 is suspended by two arms 18 and 20 on the substrate 6 as may be seen in FIG. 2.

The conductor patterns 14 which are arranged regularly on the grid 12 can have various shapes, as will be seen better below, and can either be in electrical contact with one another, in which case, they are called "inductive patterns", or are electrically insulated from one another, in which case, they are called "capacitive patterns" (which is the case in FIG. 2).

In the example shown in FIG. 2, the thermometer 16 occupies a central position on the corresponding grid 12.

This thermometer 16 is formed in a part of the silicon which remains solid, in contrast to the rest of the grid.

Two electrical lines 22 and 24 may also be seen in FIG. 2 which are linked to thermometer 16.

The electrical line 22 runs to the grid from the thermometer 16 as may be seen in FIG. 2.

This line 22 then extends onto arm 18 in order to arrive on the top face of support 6 as may be seen in the left part of FIG. 2.

This line 22 forms the reading line for thermometer 16.

The other line 24 linked to this thermometer is an electrical power supply line for this thermometer.

It should be made clear that the electrical power supply is, moreover, common to all the bolometers in the matrix 4.

This line 24 lies on the grid from the thermometer 16 to then arrive on the arm 20 corresponding to this grid, then on the top face of the support 6 as may be seen in the right part of FIG. 2.

In the example shown in FIG. 2, each thermometer 16 is linked to another thermometer 26 forming a compensation thermometer allowing differential measurements to be made with thermometer 16.

The thermometer 26 is formed on the top face of the support 6 (to the left of grid 6 in the example shown).

The detector 26 is also fitted with two electrical lines namely a line 28 which is connected to line 22 of detector 16 as may be seen in FIG. 2 and another line 30 forming a reading line which is parallel to the part of this line 22 which is on the top face of the substrate 6 (left part of FIG. 2).

The matrix of bolometers 4 is arranged in rows and if there are, for example, ten bolometers per row, on the one hand, 10×2 reading lines are obtained for each row and on the other hand, there is one power supply line common to the bolometers in this row.

As may be seen in FIG. 1, the various lines from the matrix are grouped together following output buses 32 formed on the top face of the support 6.

These output buses are connected to a reading circuit 34 of the matrix 4.

In the example shown in FIG. 1, this reading circuit is hybridised on the top face of the support 6.

Various conducting lines 36 may also be seen in FIG. 1 which are connected to the reading circuit 34 and which form the input-output lines of the reading circuit.

It should be made clear that the compensation thermometer 26 is made, like thermometer 16, by implanting appropriate ions in the silicon as will be seen better below.

The bottom of the cavity 10 is metal coated in such a way that a reflecting cavity is obtained.

The distance between the conductor patterns 14 and this metal coated cavity bottom forming a reflector 37 can be equal to a quarter of the mean wavelength of the desired range of electromagnetic waves to detect with the device of FIG. 1.

It should also be made clear that, this device, to operate with high performance, may also be at a temperature lower than a few Kelvin, for example 0.3K and put under cryogenic vacuum.

For certain applications, the device can be used at ambient temperatures.

The matrix of bolometers shown schematically in FIG. 1 is a monolithic matrix including bolometers or pixels which are approximately contiguous and which may be numerous, for example about a hundred.

The use of a monolithic matrix with a large number of contiguous pixels allows, in contrast to the known devices above-mentioned, spatial oversampling.

An absorption very close to 100% and spectrally selective is created with the help of each bolometer.

The spectral selectivity and the optical aperture or field of view can be improved with the help of optical means (not shown) linked to the bolometers for using the device.

It should be noted that the principle of the invention can be applied to create the equivalent of a black paint necessary to control the reflected fluxes in the enclosure in which the detection device is placed.

A method which enables the assembly of bolometers for the device to be manufactured in a collective manner, will be described later.

It is not essential for the cryogenic MOS type reading circuit to be placed in the focal plane of the device but this is advantageous in order to have a complete component in this focal plane.

The device in FIG. 1 combines the following three principles:

the principle of absorption by a quarter wave resonant cavity (a principle used in anti-radar devices) and, for this subject, reference is made to document (6), the principle of absorption by excitation of electromagnetic surface waves and, for this subject, reference is made to document (7), and the principle of wavelength selectivity of a sub-millimeter filter using a regular network of metal patterns and, for this subject, reference is made to document (8), whilst, at the same time noting that in this document (8), there is no question of using the absorption property of a metal of matched resistivity.

For each of the bolometers of the device, an example of which is shown in FIG. 2, the performance becomes higher the lower the temperature (of the order of 0.1K to 0.3K for example), the lower its heat capacity and the more optimum its thermal insulation.

The low heat capacity condition is realized by the choice of a grid rather than a homogeneous plane.

This condition guarantees relative immunity, even in relation to cosmic particles present particularly in a space environment.

Two characteristics of the device in FIG. 1 contribute to the creation of a double electromagnetic resonance with respect to an incident wave, namely:

the cavity under the grid, at the bottom of which, a metal reflector coating is deposited at a distance which can be equal to a quarter of the mean wavelength of the waves that one wishes to detect, and the conductor patterns (metal deposits) on the silicon grid, patterns which can have the shape of a cross or of an L for example, and which may or may not be dissociated from one another.

These patterns are reproduced following the regular spacing of the grid and have a length equivalent to half the wavelength for which resonance and hence absorption is sought, as well as a suitable electrical resistance per square.

With a device of the type in FIG. 1, absorptions close to one can be obtained, with relatively low spectral selectivity (absorption greater than 95% from 200 to 400 μm wavelength) and a low dependence (of a few %) with respect to the angle of incidence of the waves (less than 30° in absolute value).

From the thermometric point of view, the thermometer 16, placed in the center of the grid and the thermometer 26 located on the support 6 (temperature reference support) or possibly at the center of a blind grid (a grid fitted with conductor patterns which do not interact with the wavelengths that one wishes to detect) allow differential measurement in order to be free from parasitic fluctuations of reference temperature as well as large scale spatial dispersions from the bolometers.

In an advantageous variant, not shown, which leads to better compensation, the thermometer 26 is placed at the centre of an extra thermally insulated arm of the support 6, placed along one side of pixel 8 in such a way that the thermal insulation for each of the thermometers is equal.

These two thermometers can be based on the transport properties of the implanted silicon.

For this subject, reference is made to document (2).

The device in FIG. 1 has high performance at 0.3K and it is usable for most space or ground applications.

This performance is still better at 0.1K.

Given the packing factor of the grid, the resistance per square of the metallic film that is used to match the impedance is lower than that necessary in the case of bolometers formed on an homogeneous plane and generally using a layer of bismuth.

To create this metallic film, a thin layer of aluminium can be used or one of TIN (titanium deposited under nitrogen) the resistivity of which can be three orders of magnitude greater than that of a massive material because of its granular nature and according to the deposition method used.

An implantation into the silicon itself can also be carried out, this allowing a much better thermal coupling between the pools of electrons in the absorbent layer and the pools of phonons in the support; on the other hand the heat capacity of the film will be greater.

This coupling is very sensitive to the temperatures being considered

The principle of operation of the device in FIG. 1 will be explained below.

The known principle of the resonant cavity allows the electric field to be amplified at the metal where an electrical current density is induced, through discontinuity of the magnetic field.

This current dissipates, through the Joule effect in the resistive metal, a power which corresponds to an absorption of an incident wave.

On this subject, reference is made to document (6).

When the grid, which is coated with inductive metallic patterns (respectively capacitive), has a spacing relatively less than the mean wavelength of the incident waves, then, from the electromagnetic point of view, this grid is seen as a resistive and inductive homogeneous plane (respectively resistive and capacitive) and becomes equivalent to a classic sub-millimeter bolometer.

When the wavelength is greater than the grid spacing and the size of the metallic pattern is half the wavelength that one is seeking to absorb, one has resonance at this wavelength.

On this subject, reference is made to document (7).

If the conductor patterns do not have electrical continuity, that is to say, they are capacitive, the current induced in the layer will, in its turn, resonate from the point when the characteristic length of the patterns is equal to half the mean wavelength of the incident waves.

The interesting feature of a grid compared with an homogeneous plane is, above all, the gain in heat capacity (the volume is significantly reduced) and on the other hand, a wider absorption band.

Hence the grid-resonant cavity combination leads to a bolometer with much higher performance than known bolometers (having a homogeneous plane, with or without a cavity).

It should be noted that the conductor patterns alone, whether they be capacitive or inductive, do not have, in absorption, a resonant effect as marked as when they are linked to a cavity.

FIG. 1 also illustrates, in a schematic way, the possibility of linking a matrix of concentrator cones 38, sometimes called "Winston cones", to the matrix of bolometers.

In the contrary case, so as to limit the parasitic flux from the optical means (not shown) which are linked to the device and which are not necessarily cooled, one may reduce the angle of view in a collective fashion and turn to account the fact that the grid bolometers are selective, not only of wavelength but also of angle of incidence.

In the case where concentrator cones are used, each resonant cavity is metal coated, not only at the bottom but also on the sides so that a "closed" cavity is obtained.

The substrate 39 in which the cones are formed can also be made reflective on the bolometer matrix side.

Furthermore, grid filters can be linked to the bolometers of the device in FIG. 1 (forming "negatives" of the grid bolometers)

These grid filters are then coupled, that is to say positioned at a distance of the order of the mean wavelength to be detected so as to make these filters and the bolometers interdependent in the sense that the spectral response obtained is not equivalent to the product of the spectral transmission of the filters by the spectral absorption of the device.

The possibility should finally be noted, through construction, of making the cavities anti-resonant at a wavelength $\lambda 1$ and of making the capacitive grids resonant at a wavelength $\lambda 2$.

The height of the cavity is chosen to be half the mean wavelength of the waves to be rejected.

In this case, the cavities do not absorb these waves, from which the expression "anti-resonant cavities" comes.

Bringing together this anti-resonance effect and the resonance effect of capacitive grids leads to spectral absorptions which can be modulated to obtain, for example, absorption pass band filters or even double absorption pass band filters.

FIGS. 3A to 3H illustrate schematically a method of manufacture which allows a device of the type in FIGS. 1 and 2 to be obtained.

A substrate 40 of the SIMOX type is used (FIG. 3A) including a primary substrate 42 of silicon overlaid by a layer 44 of silica, itself overlaid by a layer 46 of silicon.

The thermometers 16 are produced by local implantation in the silicon layer 46.

The various metal coated parts of the grid 48 (conductor patterns) are made by deposition and etching of a metallic layer.

Then (FIG. 3B) the various thermometers are masked and the various metal coatings to the grid are made using a layer of photosensitive resin 50.

The resin mask has a shape appropriate to the etching enabling grids of silicon and the linking arms from the grid to the substrate to be obtained (not shown but which were mentioned in the description of FIG. 2).

Figure 3A:
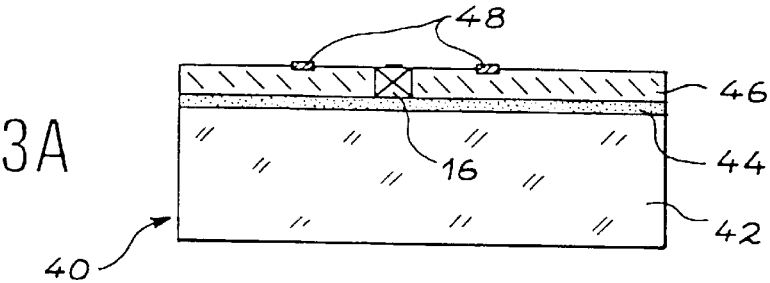
FIG. 3I illustrates schematically one step of a method, also including the steps illustrated in FIGS. 3A to 3D, and which allows to obtain another device in accordance to the invention.
Figure 3B:
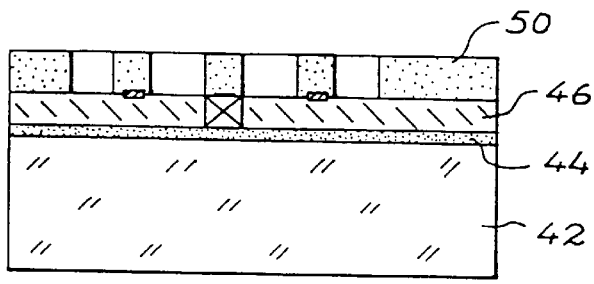
Figure 3C:
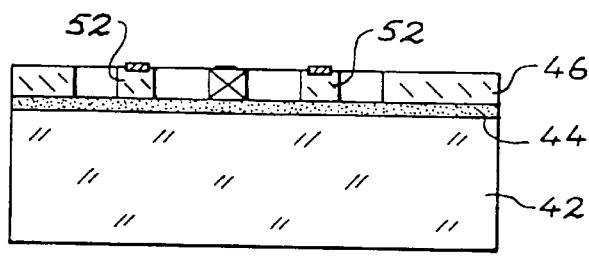

This etching step is illustrated by FIG. 3C and leads to the creation of the grids 52 and the linking arms and to the individualisation of the thermometers.

The layer 44 of silica is then etched to create the thermal insulation of the grids 52 (FIG. 3D) whilst sparing their support points (arms).

Figure 3D:
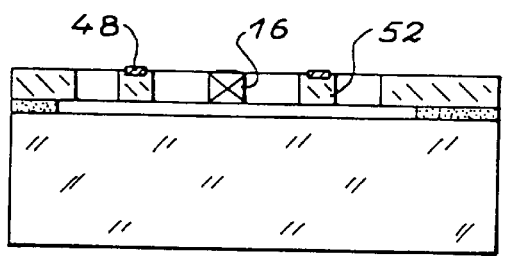
Figure 3E:
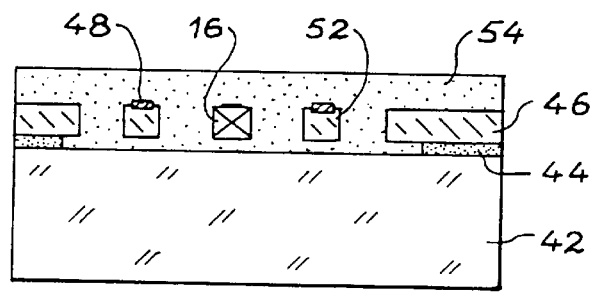

Then a layer of photosensitive resin 54 is deposited on the assembly thereby obtained, in which there are the grids (FIG. 3E).

Figure 3F:
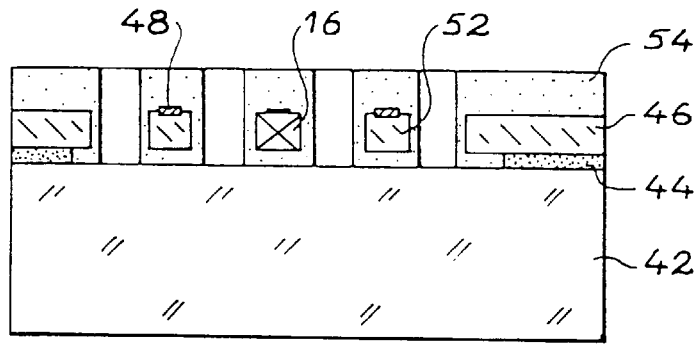
Figure 3G:
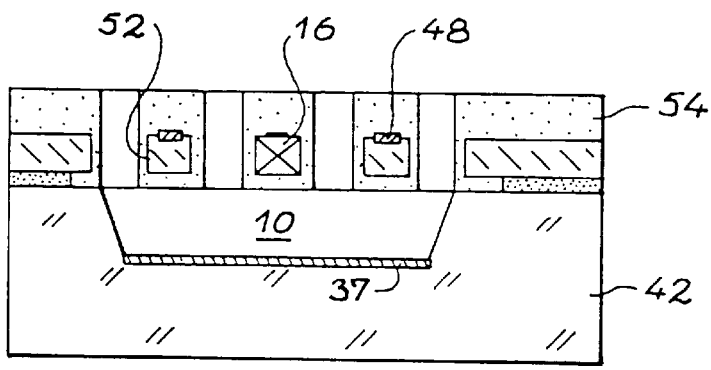

This resin layer is etched in such a way that access holes are formed to the top surface from the primary substrate 42 (FIG. 3F).

The silicon of this substrate 42 is then etched (FIG. 3G) through these holes so as to obtain each cavity 10 (already mentioned in the description of FIG. 2) and a reflecting metal layer 37 is deposited on the bottom of each cavity 10.

Figure 3H:
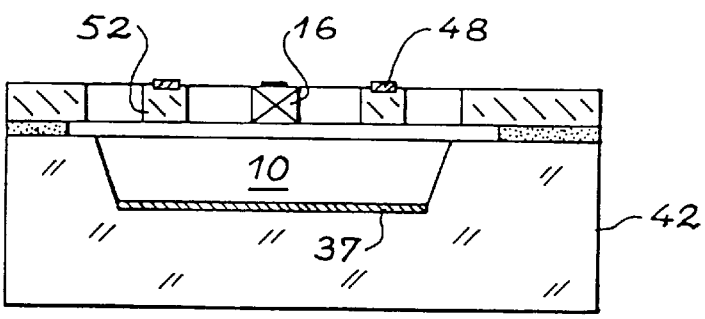

Then the layer of resin 54 is removed (FIG. 3H).

Another method of manufacturing a bolometric detection device in accordance to the invention is described below.

This other method also includes the steps described referring to FIGS. 3A to 3D.

Figure 3I:
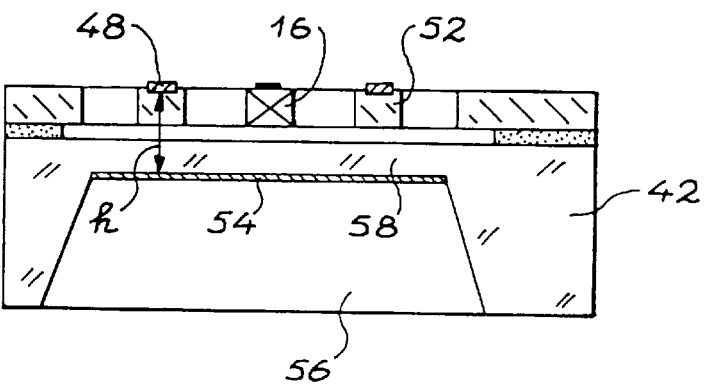

However, this other method is simpler given that after the step corresponding to FIG. 3D, just one step is added, illustrated by FIG. 3I.

In the course of this step, the silicon of the primary substrate 42 is etched from its bottom face and a metal coating 54 is deposited on the bottom of each area 56 thus etched.

This metal layer 54 forms a reflector on the back face of the resonant cavity 58 as may be seen in FIG. 3I.

In this case, this resonant cavity 58 is formed by a thickness of silicon.

The distance h between the reflector 54 and the conductor patterns 48 is close to $\lambda/(4n)$, where $\lambda$ is the mean wavelength of the waves to be detected and n is the optical index of the silicon.

It will be noted that with this other method of manufacture one obtains a resonant cavity of silicon and not a cavity void of material.

FIGS. 4 to 7 illustrate schematically various conductor patterns which can be used in devices in accordance to the invention.

In FIG. 4, patterns 14 in the shape of a cross can be seen which are formed on the silicon grid 12.

Also in FIG. 4 the metal coating 37 can be seen forming the reflector of the cavity of the bolometer which is made up of the patterns 14.

This layer 37 is made of a metal of very low resistivity, with a thickness of the order of 1 $\mu$m and having a resistance per square less than Zo/N, Zo being the impedance of the vacuum (377 $\Omega$) and N being greater than 100.

It is then a question of a reflector.

As has been seen above, the distance h between the conductor patterns 14 and this metal layer 37 is close to a quarter of the wavelength to be detected $\lambda$ when the medium between the grid and the reflector is the void.

However, the distance h is close to $\lambda/(4n)$ where n is the optical index of the medium separating the grid and the reflector, when this medium is not the void (but silicon in the example seen above).

The grid 12, made of a material transparent to the waves to be detected and of a thickness of the order of 1 $\mu$m or less is used as a mechanical support.

The conductor patterns 14 have a thickness less than 1 $\mu$m and are made of a metal of given resistivity with a resistance per square of the order of AZo/n1.

The parameter n1 is a factor dependant on the optical indices of the media situated between the metallic patterns and the reflector.

The parameter A is between 0 and 1 and is a factor dependant on the geometry of the metallic patterns.

The analytical expressions not being simple to obtain, a simulation by a resolution of the Maxwell equations is necessary.

It should be made clear that the spacing or period p of the grid can be identical or different according to two perpendicular axes in the plane of the grid.

This spacing p is of the order of the minimum wavelength to be detected so as to avoid any Bragg diffraction.

The width l of the grid can be freely chosen within the limits of production technology and on condition that a parameter A between 0 and 1 is obtained.

The interest in having a low value for parameter A is to obtain bolometers of very low heat capacity and an immunity with respect to cosmic particles in a space environment.

The length L of the patterns (in the capacitive case illustrated in FIG. 4) is of the order of half the mean wavelength to be detected.

It should be noted that one may impose the length L of the patterns independently from the period p of the grid taking account of topological constraints.

The parameter a represents the width of the patterns and it is less than 1.

The parameter b represents the minimum space between the patterns which is limited by the feasibility of the grid from the technological point of view.

Things are managed so that the packing factor of the metal grid is close to that of the support.

FIG. 5 illustrates schematically other patterns 60 of the capacitive type.

These patterns 60 have the shape of frames, each surrounding an opening 62 of the grid made of silicon 12.

FIG. 6 illustrates schematically other patterns 64 of the capacitive type still in the shape of a cross.

In the case of FIG. 6, two branches of these patterns 64 in the shape of a cross are placed between two neighbouring openings 62 of the grid 12.

FIG. 7 illustrates schematically another example of conductor patterns 66 which can be used in the invention, these patterns 66 in FIG. 7 being in electrical contact with each other and therefore being of the inductive type.

The examples which have gone before illustrate grids with "Cartesian" periodicity (in accordance with two perpendicular axes in the plane of the grid).

The invention is not limited to such grids.

Devices in accordance to the invention can be created in which the periodicity of the grid and of its metallic patterns is radial and circular in the plane of the grid.

The documents quoted in this description are the following:

(1) "Bolometers for infrared and millimeter waves", P. L. Richards, J. Appl. Phys. 76(1), 1st Jul. 1994, pp. 1 to 24

(2) "Monolithic silicon bolometers", P. M. Downey et al., Applied Optics, vol. 23, No. 6, 15th Mar. 1984, pp. 910 to 914

(3) "Issues in the readout of FIR and mm-wave bolometers for astrophysical applications", P. T. Timbie et al., SPIE vol. 2226 Infrared Readout Electronics II (1994), pp. 2 to 13

(4) "Développement et exploitation de bolomètres au sol" (Development and use of bolometers on the ground), R. Neri et al., Internal note from l'Institut de Radio-Astronomie Millimétrique (5) "FIRST Far-Infra-Red and sub-millimeter space telescope", S. Beckwith et al., European Space Agency, SCI (93)6, September 1993

(6) "Infrared and millimeter wave absorber structures for thermal detectors", A. Hadni et al., Infrared Phys. vol. 30, No. 6, 1990, pp. 465 to 478

(7) "Absorption of electromagnetic radiation in a layered metal and insulator structure", A. Ya. Blank et al., Journal of Communications Technology and Electronics, 39(3), 1994, pp. 113 to 122

(8) "Millimeter-sub-millimeter wavelength filter system", L. A. Page et al., Applied Optics, vol. 33, No. 1, 1st Jan. 1994, pp. 11 to 23.

We claim:

1. A bolometric detection device for millimeter or sub-millimeter waves, the device including at least one bolometer formed on a support transparent to the waves to be detected, the device being characterized in that each bolometer includes:

a reflecting resonant cavity, a grid thermally insulated from the support and positioned above the cavity, an assembly of periodic patterns of electrical conductors which are formed on the grid and whose electrical impedance is matched to that of vacuum, and a main thermometer integral with the grid.

2. A device according to claim 1, characterized in that the patterns are electrically connected to each other.

3. A device according to claim 1, characterized in that the patterns are electrically insulated from each other.

4. A device according to claim 3, characterized in that a size of the patterns is of the order of half the mean wavelength of the waves to be detected.

5. A device according to claim 1, characterized in that a period of the grid is of the order of half the mean wavelength of the waves to be detected.

6. A device according to claim 1, characterized in that each bolometer includes, in addition, an auxiliary thermometer associated with the main thermometer for the purpose of making differential temperature measurements.

7. A device according to claim 1, characterized in that it includes, in addition, an electronic circuit for reading signals supplied by each bolometer.

8. A device according to claim 1, characterized in that each bolometer is associated with a concentrator cone.

9. A device according to claim 1, characterized in that it includes a matrix of M×N bolometers, M and N being whole numbers at least equal to 1.

10. A method of manufacturing the detection device according to claim 1, characterized in that it includes the following steps:

forming the main thermometer and the bolometer conductor patterns on a silicon/silica/silicon substrate, forming the grid of the bolometer on this substrate, removing the silica from the substrate under this grid, and forming the reflecting resonant cavity under the grid.

11. A method according to claim 10, characterized in that, to form the cavity, the silicon is removed from the substrate, under the grid, from the back face of the substrate, allowing a layer of silicon to remain, the thickness of which corresponds to resonance of said cavity, and a reflecting layer is formed on this silicon layer on a side of the back face of the substrate.

12. A method according to claim 10, characterized in that, to form the cavity, the silicon is removed from the substrate, under the grid, from the front face of this substrate, and to a depth corresponding to resonance of said cavity, and a reflecting layer is formed facing the grid, in the bottom of the cavity thus obtained by the removal of silicon.

* * * * *